US012643256B2

(12) United States Patent
Xu et al.

(10) Patent No.: US 12,643,256 B2
(45) Date of Patent: Jun. 2, 2026

(54) CHAINSAW AND METHODS FOR DETERMINING AND RELEASING A JAMMED STATE OF THE CHAINSAW

(71) Applicant: Nanjing Chervon Industry Co., Ltd., Nanjing (CN)

(72) Inventors: Zhen Xu, Nanjing (CN); Kai Hu, Nanjing (CN); Huaishu Wang, Nanjing (CN); Junya Duan, Nanjing (CN); Huaguo Zhu, Nanjing (CN); Minggui Xiao, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 127 days.

(21) Appl. No.: 18/451,678

(22) Filed: Aug. 17, 2023

(65) Prior Publication Data

US 2024/0116208 A1 Apr. 11, 2024

(30) Foreign Application Priority Data

Sep. 30, 2022 (CN) ......................... 202211206993.9
Sep. 30, 2022 (CN) ......................... 202211207122.9

(51) Int. Cl.
*B27G 19/00* (2006.01)
*B27B 17/08* (2006.01)

(52) U.S. Cl.
CPC .......... *B27G 19/003* (2013.01); *B27B 17/083* (2013.01)

(58) Field of Classification Search
CPC .................... B27B 17/02; B27B 17/08; B27B 17/083-086; B27B 17/12; B27G 19/003
See application file for complete search history.

(56) References Cited

U.S. PATENT DOCUMENTS 4,354,183 A * 10/1982 Weeks .................. G01K 1/026 374/E1.005
4,445,470 A * 5/1984 Chmielewski ......... F01M 11/10 123/73 AD (Continued)

FOREIGN PATENT DOCUMENTS

| | | |
|---|---|---|
| CN | 105588282 A | 6/2017 |
| CN | 109968458 A | 7/2019 |
| JP | 2018151009 A | 9/2018 |

OTHER PUBLICATIONS

Extended European Search Report from EU application No. 23191849.1, dated Jan. 24, 2024, 7 pp.

*Primary Examiner* — Ghassem Alie
*Assistant Examiner* — Richard D Crosby, Jr.
(74) *Attorney, Agent, or Firm* — Greenberg Traurig, LLP

(57) ABSTRACT

A chainsaw includes a chain, a liquid pump assembly, a motor, and a controller. The chain is used for implementing a cutting operation. The liquid pump assembly includes a liquid pump and a motor. The liquid pump is used for releasing a liquid for lubricating or cooling the chain. The motor is used for at least driving the liquid pump to operate. The controller is electrically connected to at least the motor. The controller is configured to, when the liquid pump is in the jammed state, control the liquid pump assembly to enter a throttling mode in which a supplied amount of the liquid is reduced, and when the liquid pump exits the jammed state, control the liquid pump assembly to exit the throttling mode. Technical solutions provided by the present application can determine and release the jammed state of the chainsaw.

15 Claims, 8 Drawing Sheets

(56) References Cited

U.S. PATENT DOCUMENTS

| | | | | | |
|---|---|---|---|---|---|
| 4,636,147 | A * | 1/1987 | Schweitzer | F16N 13/10 | 184/33 |
| 4,644,658 | A * | 2/1987 | Dolata | F16N 7/38 | 30/381 |
| 4,802,555 | A * | 2/1989 | Matsunaga | B27B 17/12 | 184/55.1 |
| 5,182,720 | A * | 1/1993 | Beck | F16N 29/02 | 700/282 |
| 6,571,157 | B1 * | 5/2003 | Dahlin | B60K 6/445 | 73/114.25 |
| 7,596,998 | B2 * | 10/2009 | Zimmermann | G01F 23/22 | 73/295 |
| 8,528,217 | B2 * | 9/2013 | Kondo | B27B 17/00 | 30/296.1 |
| 9,862,116 | B2 * | 1/2018 | Barnett | F16H 63/30 | |
| 9,925,685 | B2 * | 3/2018 | Kawamura | B27B 17/12 | |
| 10,800,066 | B2 * | 10/2020 | Ferrari | B27B 17/12 | |
| 11,267,160 | B2 * | 3/2022 | Bylund | B23D 59/04 | |
| 11,826,893 | B2 * | 11/2023 | Osawa | H01M 50/213 | |
| 12,157,176 | B2 * | 12/2024 | Horn | B27B 19/006 | |
| 2010/0043234 | A1 | 2/2010 | Pellenc | | |
| 2012/0247876 | A1 * | 10/2012 | Kreutzkamper | F16N 7/385 | 184/14 |
| 2013/0276313 | A1 * | 10/2013 | Zhou | A01G 3/037 | 30/228 |
| 2017/0021523 | A1 * | 1/2017 | Haney | B27B 17/12 | |
| 2020/0276661 | A1 | 9/2020 | Bylund | | |

* cited by examiner

CHAINSAW AND METHODS FOR DETERMINING AND RELEASING A JAMMED STATE OF THE CHAINSAW

RELATED APPLICATION INFORMATION

This application claims the benefit under 35 U.S.C. § 119(a) of Chinese Patent Application No. 202211206993.9, filed on Sep. 30, 2022, and Chinese Patent Application No. 202211207122.9, filed on Sep. 30, 2022, which applications are incorporated herein by reference in their entirety.

BACKGROUND

In the related art, a chainsaw is a cutting tool mainly used for felling and bucking, which performs a cutting operation on wood through a reciprocating motion of a chain. In the chainsaw, the chain is generally driven by a motor, and since the chain needs to be lubricated or cooled during the reciprocating motion, an oil pump and an oil can need to be disposed inside the chainsaw. The oil pump drives a liquid in the oil can to be transported to the chain via an oil passage to lubricate or cool the chain. However, in practical use, the oil passage may be jammed and thus the chain cannot be fully lubricated or cooled, affecting the cutting operation of an operator.

This part provides background information related to the present application, which is not necessarily the existing art.

SUMMARY

In some examples, a chainsaw includes a chain, a liquid pump assembly, a motor, and a controller. The chain is used for implementing a cutting operation. The liquid pump assembly includes a liquid pump and a motor. The liquid pump is used for releasing a liquid for lubricating or cooling the chain. The motor is used for at least driving the liquid pump to operate. The controller is electrically connected to at least the motor. The controller is configured to, when the liquid pump is in a jammed state, control the liquid pump assembly to enter a throttling mode in which a supplied amount of the liquid is reduced, and when the liquid pump exits the jammed state, control the liquid pump assembly to exit the throttling mode.

In some examples, a method for releasing a jammed state of a chainsaw is provided. The chainsaw includes a chain, a liquid pump, a motor, and a controller. The chain is used for implementing a cutting operation. The liquid pump is used for releasing a liquid for lubricating or cooling the chain. The motor is used for at least driving the liquid pump to operate. The controller is electrically connected to at least the motor. The method includes the following steps: when the liquid pump is in a jammed state, controlling a liquid pump assembly to enter a throttling mode in which a supplied amount of the liquid is reduced; and when the liquid pump exits the jammed state, controlling the liquid pump assembly to exit the throttling mode.

In some examples, a chainsaw includes: a chain for implementing a cutting operation; a first motor for driving the chain to operate; a liquid pump assembly including a liquid pump and a second motor for driving the liquid pump to operate; a temperature detection module for detecting an ambient temperature of the chainsaw; and a controller electrically connected to at least the first motor and the liquid pump assembly. The controller is configured to acquire the ambient temperature outputted from the temperature detection module, and when the ambient temperature is greater than a first temperature threshold, control the second motor to start.

DETAILED DESCRIPTION

Figure 1:
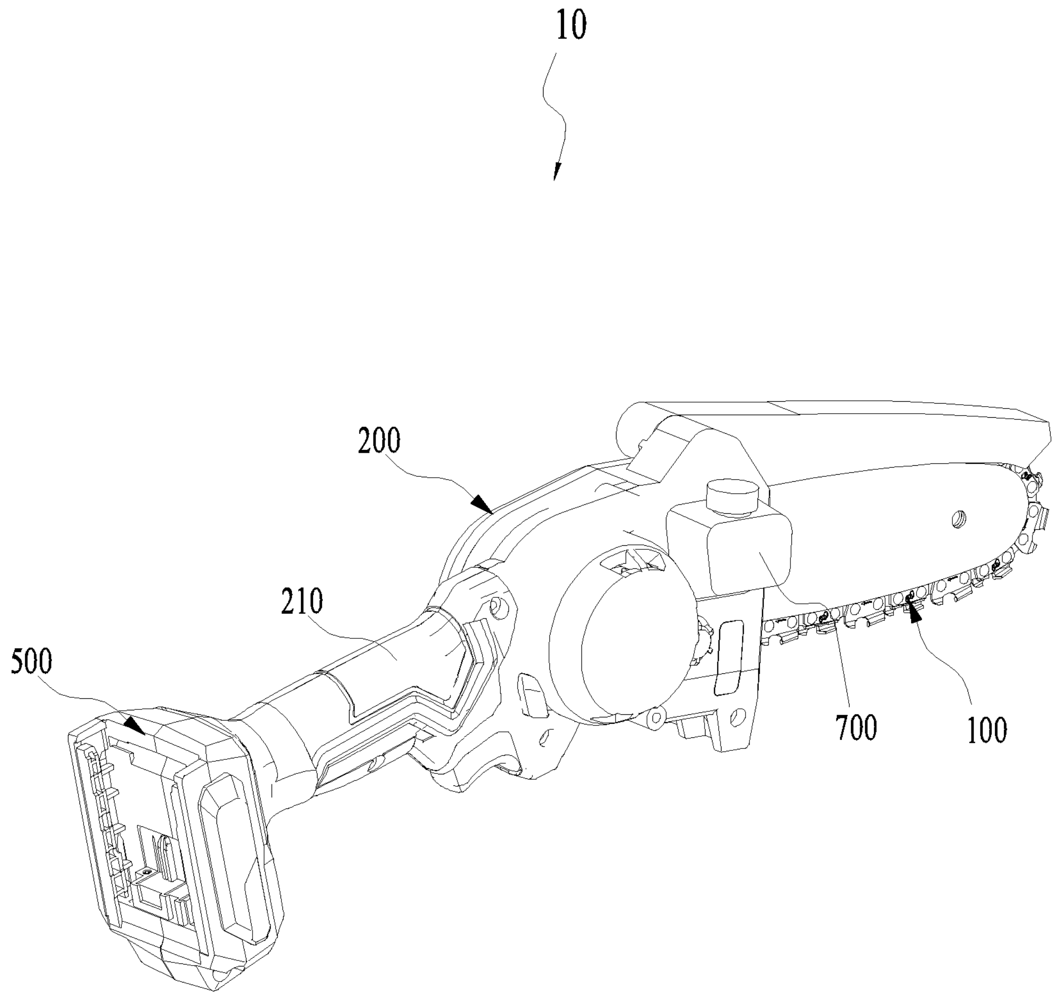
FIG. 1 is a perspective view of a chainsaw according to an example of the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

Figure 2:
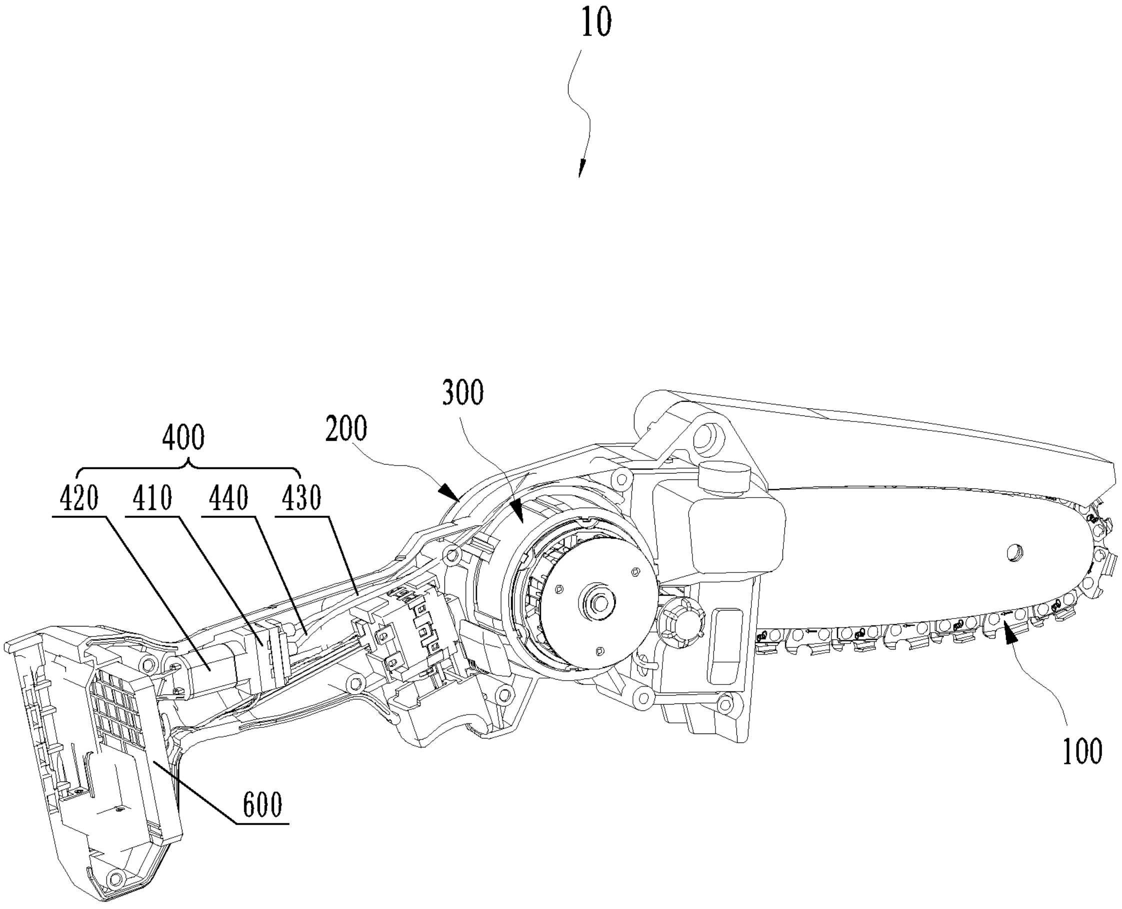
FIG. 2 is a perspective view of the chainsaw in FIG. 1 with part of a housing removed.
Figure 3:
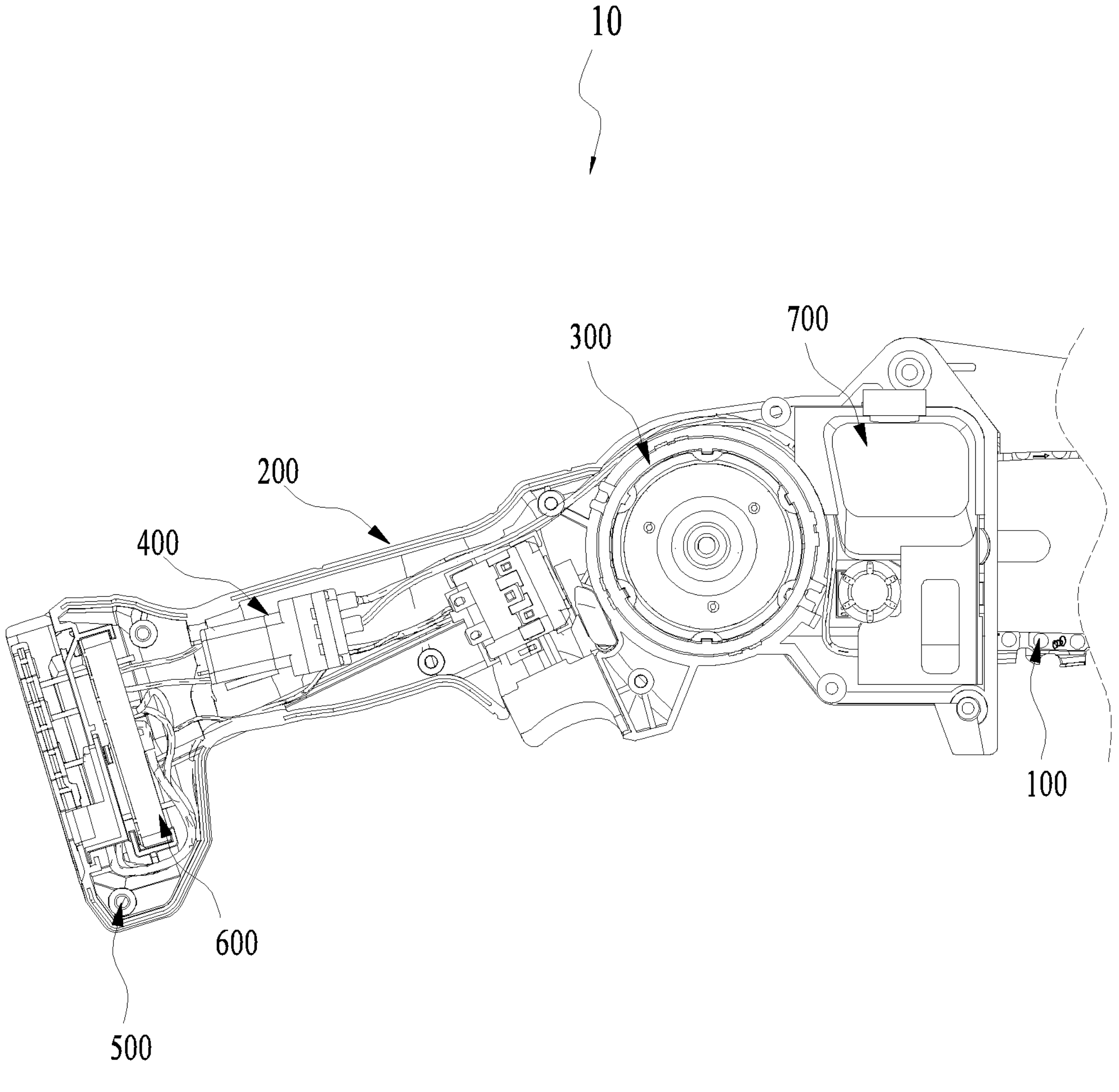
FIG. 3 is a front view of part of the structure shown in FIG. 2.

As shown in FIGS. 1 to 3, the present application provides a chainsaw 10 including a chain 100, a first motor 300, a housing 200, and a liquid pump assembly 400. The chain 100 is used for implementing a cutting operation. The first motor 300 is used for driving the chain 100 to operate, and the first motor 300, as a driver, has the advantages of a small volume, ease to install, and the like. The housing 200 is formed with a grip 210 for a user to hold, and the user may operate the chainsaw 10 by holding the grip 210. A mounting cavity is formed in the housing 200, and part of the mounting cavity extends into the grip 210. The liquid pump assembly 400 is used for cooling or lubricating the chain 100.

Specifically, the liquid pump assembly 400 includes a liquid pump 410 for releasing a liquid to lubricate or cool the chain 100. It is to be noted that the liquid here may be lubricating oil to lubricate the chain 100 and accordingly, an oil pump is selected as the liquid pump 410; or the liquid here may be cooling water to cool the chain 100 and accordingly, a water pump is selected as the liquid pump 410.

In some specific examples, the liquid pump 410 may be driven by the first motor 300, that is, the first motor 300 is connected to both the chain 100 and the liquid pump 410 through transmission assemblies to simultaneously drive the chain 100 and the liquid pump 410. Optionally, a gear mechanism, a sprocket mechanism, or the like may be selected as a transmission assembly as required.

In some parallel examples, the chainsaw 10 further includes a second motor 420, a motor shaft of the second motor 420 is connected to the liquid pump 410, and the second motor 420 is used for driving the liquid pump 410 to operate. Compared with the first motor 300 for simultaneously driving the chain 100 and the liquid pump 410, the independent second motor 420 is additionally disposed as a piece for driving the liquid pump 410 so that not only can a transmission assembly with a complex structure be omitted, but also it is easier to dispose the second motor 420 in the mounting cavity of the housing 200 since the second motor 420 occupies a small space, facilitating the full use of the space in the housing 200 and the miniaturization of the chainsaw 10.

As shown in FIG. 3, the chainsaw 10 further includes a battery pack coupling portion 500 for coupling a battery pack. Optionally, the battery pack is detachably connected to the battery pack coupling portion 500 to be convenient to detach for replacement or charging. The battery pack can supply power to the first motor 300 in addition to the second motor 420. In addition to the use of the battery pack as a power piece, the first motor 300 and the second motor 420 may be directly connected to external mains electricity through a power line, thereby achieving power supply.

Still referring to FIGS. 2 and 3, a circuit board 600 is disposed at the battery pack coupling portion 500, where the circuit board 600 is used for controlling the second motor 420, for example, controlling a rotational speed of the second motor 420. Specifically, an insertion cavity is formed in the battery pack coupling portion 500, and the circuit board 600 is inserted into the insertion cavity.

The circuit board 600 may also be used for controlling the first motor 300, for example, controlling a rotational speed of the first motor 300. One circuit board 600 is used for controlling both the first motor 300 and the second motor 420 so that one circuit board 600 can be omitted, reducing a cost and an occupied space in the housing 200.

In some examples, as shown in FIG. 2, the second motor 420 is disposed within the grip 210. The second motor 420 is disposed in a mounting cavity corresponding to the grip 210 so that a more reasonable layout can be achieved, not only can the mounting cavity corresponding to the grip 210 be utilized but also the weight of the chainsaw 10 can be more balanced, and the user uses the chainsaw with less labor.

Optionally, still referring to FIG. 2, the liquid pump 410 is disposed within the grip 210, that is, the liquid pump 410 is disposed in the mounting cavity corresponding to the grip 210. Both the liquid pump 410 and the second motor 420 are disposed in the mounting cavity corresponding to the grip 210, thereby facilitating a direct connection between the second motor 420 and the liquid pump 410 and avoiding a need to dispose a transmission structure for power transmission between the second motor 420 and the liquid pump 410.

Along an operation direction of the chainsaw 10, the liquid pump 410 and the second motor 420 are arranged front and back. In this manner, the space of the mounting cavity in the grip 210 can be fully utilized, and the liquid pump 410 and the second motor 420 are easy to assemble. Furthermore, along the operation direction of the chainsaw 10, the liquid pump 410 is disposed on the front side of the second motor 420. Furthermore, the liquid pump 410 and the second motor 420 both extend along a preset direction at a preset angle relative to a horizontal direction. It is to be noted that the preset angle here may be an acute angle, an obtuse angle, or a right angle. The liquid pump 410 and the second motor 420 may both extend along a vertical direction or along the horizontal direction.

As shown in FIGS. 2 and 3, the liquid pump assembly 400 further includes an oil can 700 and an oil passage, where the oil passage includes a first oil passage 430 and a second oil passage 440. The liquid pump 410 has a first liquid port and a second liquid port, where the first liquid port communicates with an end of the first oil passage 430, and the other end of the first oil passage 430 is disposed within a reservoir formed by the chain 100. The second liquid port communicates with the oil can 700 via the second oil passage 440. Driven by the liquid pump 410, the lubricating oil or the cooling water stored in the oil can 700 can enter the liquid pump 410 through the second oil passage 440 and enter the reservoir at the chain 100 through the first oil passage 430. When the chain 100 works, the liquid in the reservoir can lubricate or cool the chain 100.

In some examples, the oil can 700 is disposed within the grip 210, that is, the oil can 700 is disposed in the mounting cavity corresponding to the grip 210. The oil can 700 is disposed in the mounting cavity corresponding to the grip 210 so that not only can the mounting cavity corresponding to the grip 210 be utilized and the weight of the chainsaw 10 be more balanced, but also the oil can 700 can be closer to the liquid pump 410 disposed within the grip 210 and the required length of the second oil passage 440 can be effectively reduced. Further, the oil can 700 is integrated on an inner wall surface of the housing 200 so that the oil can 700 can be formed while the housing 200 is manufactured, thereby avoiding the phenomenon of an accidental detachment of the oil can 700.

Figure 4:
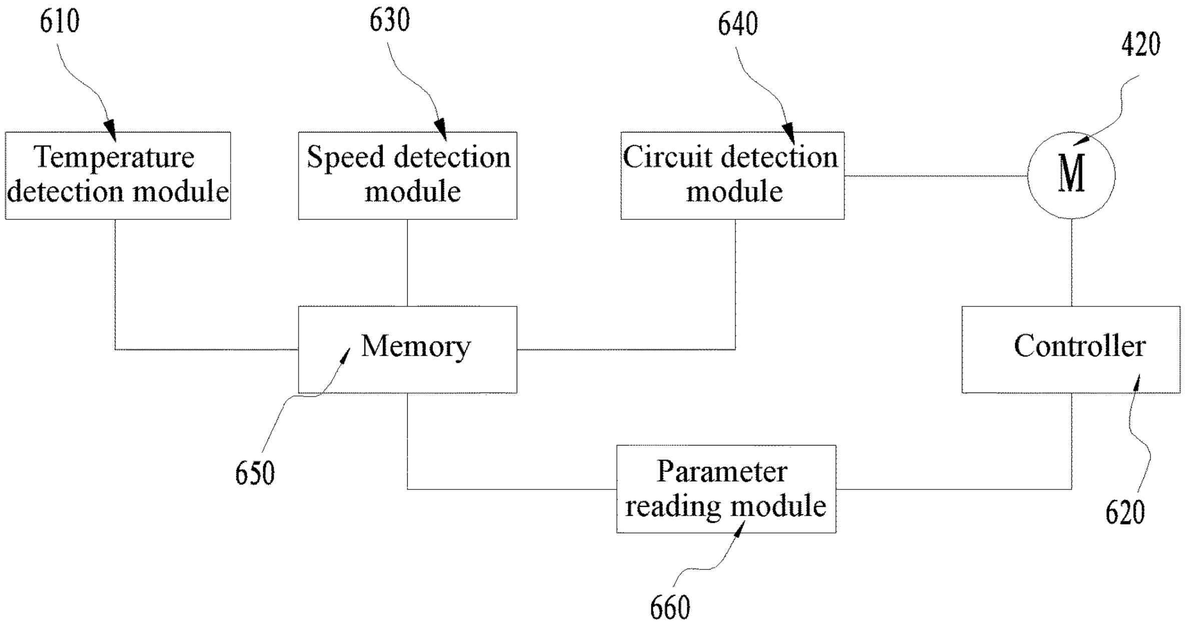
FIG. 4 is a block diagram of control modules of a chainsaw of the present application.

As shown in FIG. 4, in some examples, the chainsaw 10 may also include a temperature detection module 610, a controller 620, a speed detection module 630, a memory 650, a parameter reading module 660, and a circuit detection module 640.

The temperature detection module 610 may be used for detecting an ambient temperature, the temperature of the first motor 300, the temperature of the second motor 420, or the temperature of the circuit board 600. Specifically, a temperature sensor may be disposed on the inner wall surface of the housing 200 to detect the ambient temperature in the mounting cavity, a temperature sensor may be disposed on a surface or in the vicinity of the first motor 300 to detect the temperature of the first motor 300, a temperature sensor may be disposed on a surface or in the vicinity of the second motor 420 to detect the temperature of the second motor 420, or a temperature sensor may be disposed on a surface or in the vicinity of the circuit board 600 to detect the temperature of the circuit board 600. Optionally, the temperature detection module 610 may acquire the ambient temperature detected by the temperature sensor disposed on an inner wall of the mounting cavity of the housing 200 and use the ambient temperature in the mounting cavity of the housing 200 as the temperature of the chainsaw 10.

The controller 620 may be one separate single-chip microcomputer or may be composed of multiple distributed single-chip microcomputers. The single-chip microcomputer can run control programs to control the first motor 300, the second motor 420, and other functional modules on the circuit board 600 to implement their functions.

The speed detection module 630 may be used for detecting the rotational speed of the first motor 300 and the rotational speed of the second motor 420.

The circuit detection module 640 may be used for detecting an electrical parameter of a control circuit, where the electrical parameter may be a voltage value or a current value, and a variation of the voltage value or a variation of the current value within a preset duration may be calculated according to the voltage value or the current value. Specifically, a voltage value or a current value of the first motor 300 or the second motor 420 may be detected.

The memory 650 may be used for storing a preset parameter of the chainsaw 10. For example, data such as an empirical parameter and a gear ratio of the transmission assembly are pre-stored in the memory 650. The memory 650 may also be used for storing parameters detected by the temperature detection module 610, the speed detection module 630, and the circuit detection module 640.

The parameter reading module 660 may be used for reading data stored in the memory 650.

In some examples, the first motor 300 may simultaneously drive the chain 100 and the liquid pump 410. In this example, the first motor 300 has a relatively high load capacity and is generally not damaged due to too large a load when directly started at a conventional low temperature. In some examples, the first motor 300 drives the chain 100, the second motor 420 drives the liquid pump 410, and the second motor 420 has a lower load capacity than the first motor 300. In this example, the second motor 420 may be damaged due to too large a load when directly started at a low temperature. The present application provides an example that can prevent the second motor from being damaged due to too large a load when started at a low temperature.

The controller 620 is electrically connected to the first motor 300 and the liquid pump assembly 400. Specifically, the controller 620 is electrically connected to the first motor 300, the second motor 420, and the temperature detection module 610. The controller is configured to be capable of controlling the first motor 300 to start and stop, controlling the second motor 420 to start and stop, and acquiring an ambient temperature TO detected by the temperature detection module 610.

The controller 620 is electrically connected to the temperature detection module 610 to acquire the ambient temperature TO. The ambient temperature TO may be the ambient temperature in the mounting cavity of the housing 200 and detected by the temperature detection module 610. When the ambient temperature TO is greater than a first temperature threshold T1, the controller 620 controls the second motor 420 to start.

When the working environment of the chainsaw 10 has a relatively low temperature, if the second motor 420 is directly started, the second motor 420 has too large a current and an increase in load. In this example, it is set that the second motor 420 is allowed to start only when it is greater than the first temperature threshold T1 so that the problem that the motor is damaged due to too large a load when directly started at a low temperature can be avoided.

If the first temperature threshold T1 is too low, a relatively large current is generated when the second motor 420 is started. If the first temperature threshold T1 is too high, an operator waits for a relatively long time, affecting working efficiency. Considering common working scenarios of the chainsaw 10, it may be set that the first temperature threshold T1 is greater than or equal to −25° C. and less than or equal to −5° C., so as to balance the preceding conflicting requirements.

In some low-temperature environments, after the chainsaw 10 is used for operation for a period of time, the operator turns off the chainsaw 10 for a short time, during which heat in the mounting cavity of the housing 200 is continuously lost and the temperature continuously decreases. When the operator restarts the chainsaw 10, if the ambient temperature TO is lower than the first temperature threshold T1, the second motor 420 cannot be started immediately, and the operator needs to wait for a period of time before continuing to use the chainsaw 10, affecting the working continuity of the operator.

The controller 620 acquires a length of time L0 from when the first motor 300 is turned off to when the first motor 300 is restarted to obtain the length of time L0 from when the chainsaw 10 is turned off to when the chainsaw 10 is restarted. If the length of time L0 is greater than a preset waiting duration L1, the controller 620 determines that the chainsaw 10 is not restarted by the operator in a short time and controls the chainsaw 10 through steps S110 and S120. If the length of time L0 is less than or equal to the preset waiting duration L1, the controller 620 determines that the chainsaw 10 is restarted by the operator in a short time. At this time, a second temperature threshold T2 for the controller 620 to control the second motor 420 to restart should be lower than the first temperature threshold T1.

To provide a better user experience, in some examples, the controller 620 may also acquire the length of time L0 from when the first motor 300 is turned off to when the first motor 300 is restarted. If the length of time L0 is less than or equal to the preset waiting duration L1 and the ambient temperature TO is greater than the second temperature threshold T2, the controller 620 controls the second motor 420 to start. The second temperature threshold T2 is lower than the first temperature threshold T1.

When the chainsaw 10 is frequently started by the operator within a short time, a temperature threshold for the controller 620 to restart the second motor 420 is lower than a temperature threshold for the second motor 420 to start for the first time, thereby reducing the temperature threshold for the second motor 420 to start and satisfying the requirement of the operator for working continuity.

If the second temperature threshold T2 is too low, a relatively large current is also generated when the second motor 420 is started. If the second temperature threshold T2 is too high, the operator waits for a relatively long time, affecting the working efficiency. Considering common working scenarios of the chainsaw 10, it may be set that a temperature difference between the second temperature threshold T2 and the first temperature threshold T1 is 5° C. to 15° C. Specifically, the first temperature threshold T1 may be −5° C. and the second temperature threshold T2 may be −10° C.

In some examples, the first motor 300 is used for driving the chain 100 to operate, and the second motor 420 is used for driving the liquid pump 410 to release the liquid for lubricating or cooling the chain 100. When the ambient temperature TO is less than the first temperature threshold T1, the controller 620 may control the first motor 300 to start to drive the chain 100 to operate. Since the first motor 300 continuously generates heat during operation, the heat continuously accumulates in the mounting cavity of the housing 200 so that the temperature in the mounting cavity of the housing 200 increases and then the temperature of the second motor 420 increases. When the ambient temperature TO detected by the temperature detection module 610 is greater than the first temperature threshold T1, the controller 620 may control the second motor 420 to start. Thus, the second motor 420 is heated by the heat generated when the first motor 300 is working, thereby avoiding the problem of too large a load when the second motor 420 is directly started at a low temperature.

In some examples, mounting positions of the first motor 300 and the second motor 420 may be specially set such that an air path formed after the first motor 300 is started passes through the second motor 420, thereby increasing a temperature rise speed of the second motor 420 and reducing a waiting time of the operator. Optionally, the first motor 300 may be configured to perform convective heat transfer with the second motor 420, thereby increasing the temperature rise speed of the second motor 420. Optionally, the first motor 300 may be positioned near the second motor 420 so that the heat of the first motor 300 is transferred to the second motor 420. Optionally, the distance between the first motor 300 and the second motor 420 may be greater than or equal to 30 mm and less than or equal to 150 mm. Specifically, the axial distance between the first motor 300 and the second motor 420 may be greater than or equal to 30 mm and less than or equal to 120 mm. Specifically, the axial distance between the first motor 300 and the second motor 420 may be 100 mm. The preceding distance between the first motor 300 and the second motor 420 is set so that in a low-temperature environment, the heat of the first motor 300 can be rapidly transferred to the second motor 420, thereby satisfying the requirement of the operator for rapidly starting the oil pump.

In some examples, when the ambient temperature in the mounting cavity of the housing 200 and detected by the temperature detection module 610 is used as the temperature of the second motor 420, the temperature may not be accurate enough. Thus, the temperature detection module 610 may directly detect the temperature of the second motor 420 to achieve an accurate measured value. However, the surface of the second motor 420 is generally smooth and difficult for the temperature sensor to be mounted. The circuit board 600 is positioned relatively near the second motor 420 and has a relatively small temperature difference, and a suitable space for mounting the temperature sensor exists on the surface of the circuit board 600. Therefore, the temperature of the circuit board 600 may be detected by the temperature detection module 610 as the temperature of the second motor 420.

Since the circuit board 600 also generates heat in a working process, in some examples, the circuit board 600 may be configured to be capable of transferring heat to the second motor 420, thereby increasing the temperature rise speed of the second motor 420 and reducing the waiting time of the operator. Optionally, the circuit board 600 may be configured to transfer heat to the second motor 420 through a wire for an electrical connection, where the wire can transfer an electrical signal and transfer the heat of the circuit board 600 to the second motor 420.

Figure 5:
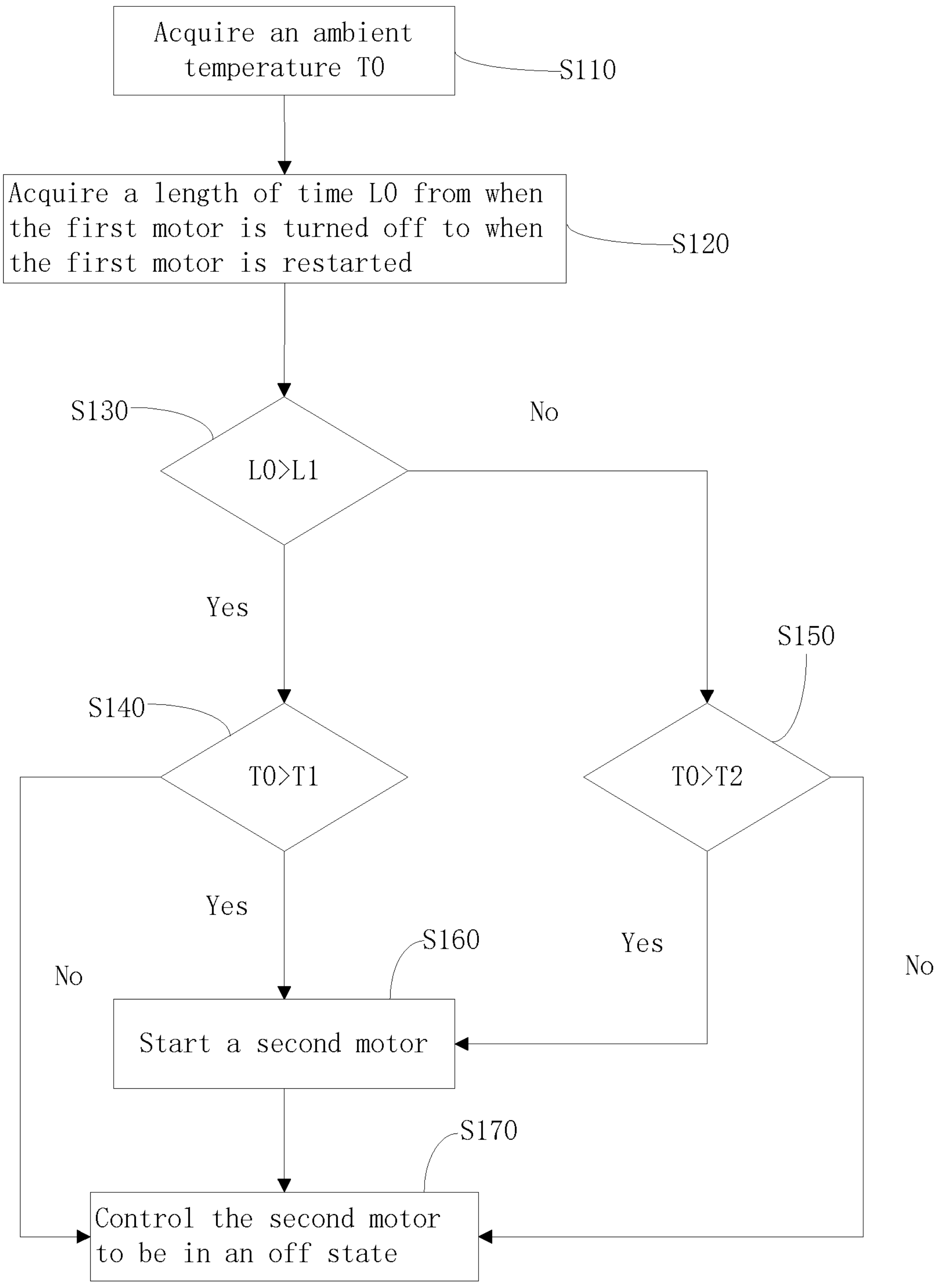
FIG. 5 is a flowchart of a control method for starting a second motor for a chainsaw of the present application.

As shown in FIG. 5, the present application further provides a control method for starting the second motor 420 of the chainsaw 10, and the control method includes the steps below.

In S110, the ambient temperature TO outputted from the temperature detection module 610 is acquired.

In S120, the length of time L0 from when the first motor 300 is turned off to when the first motor 300 is restarted is acquired.

In S130, it is determined whether the length of time L0 is greater than the preset waiting duration L1. If L0≥L1, the controller 620 determines that the chainsaw is started for the first time and performs step S140. If L0≤L1, the controller 620 determines that the chainsaw 10 is restarted in a short time and performs step S150.

In S140, it is determined whether the ambient temperature TO is greater than the first temperature threshold T1. If T0≥T1, the second motor 420 is controlled to start. If T0≤T1, the second motor 420 is controlled to be in an off state.

In S150, it is determined whether the ambient temperature TO is greater than the second temperature threshold T2. If T0≥T2, the second motor 420 is controlled to start. If T0≤T2, the second motor 420 is controlled to be in the off state. The second temperature threshold T2 is lower than the first temperature threshold T1.

The preceding parameters such as the preset waiting duration L1, the first temperature threshold T1, and the second temperature threshold T2 may be pre-stored in the memory 650 and read by the parameter reading module 660.

In some working environments, the oil passage of the chainsaw 10 may be jammed. If the jammed state cannot be identified in time and released by some measures, the chainsaw 10 may be damaged. The present application provides an example that can solve the problem of the identification and release of a jam of the oil passage.

When the oil passage is jammed, the motor for driving the liquid pump 410 to release the liquid for lubricating or cooling the chain 100 changes in voltage and current. Therefore, a variation or a change rate of an electrical parameter of the motor within a preset detection duration L2 may be monitored so as to determine whether the oil passage of the liquid pump 410 is jammed.

In some specific examples, the first motor 300 may simultaneously drive the chain 100 and the liquid pump 410 to operate. Therefore, whether the oil passage of the liquid pump 410 is jammed may be determined through a variation or a change rate of an electrical parameter of the first motor 300 within the preset detection duration L2.

In some examples, the controller 620 of the chainsaw 10 is configured to be capable of acquiring the variation or the change rate of the electrical parameter of the motor within the preset detection duration L2. When the variation of the electrical parameter of the motor is greater than or equal to a preset variation threshold of the electrical parameter or when the change rate of the electrical parameter of the motor is greater than or equal to a preset change rate threshold of the electrical parameter, the controller 620 determines that the liquid pump is in the jammed state.

However, since the first motor 300 simultaneously drives the chain 100 and the liquid pump 410 to operate, a change of the electrical parameter due to a stutter of the chain 100 in the case where part of the chain 100 stutters may be falsely determined to be caused by the jam of the oil passage. In some examples, the motor may include the first motor 300 and the second motor 420, the first motor 300 is used for driving the chain 100 to operate, and the second motor 420 is used for driving the liquid pump 410 to operate. Whether the oil passage of the liquid pump 410 is jammed may be determined through a variation or a change rate of an electrical parameter of the second motor 420 within the preset detection duration L2, thereby avoiding the false determination caused by the stutter of the chain 100.

As described above, the variation or the change rate of the electrical parameter of the first motor 300 for simultaneously driving the chain 100 and the liquid pump 410 to operate is detected in some examples, or the variation or the change rate of the electrical parameter of the second motor 420 for driving the liquid pump 410 to operate is detected in some examples so that whether the oil passage is jammed can be determined. Thus, in a description concerning example in this example, when the "motor" is used, the "motor" may represent the first motor 300 for simultaneously driving the chain 100 and the liquid pump 410 to operate in some examples or represent the second motor 420 for driving the liquid pump 410 to operate in some examples. When the "second motor" is used, the "second motor" represents the second motor 420 for driving the liquid pump 410 to operate in some examples.

Too long a preset detection duration L2 affects whether the controller 620 can determine in time that the oil passage is jammed. Too short a preset detection duration L2 puts a relatively high performance requirement on the controller 620, increasing a cost of the chainsaw 10. After multiple experiments of the applicant, it is set that the preset detection duration L2 satisfies that 20 ms≤L2≤100 ms, which can satisfy the requirements under common working conditions and achieve a better balance between performance and cost.

Optionally, the electrical parameter may be the voltage value U or the current value I of the motor. Relatively mature techniques for measuring the voltage value U or the current value I exist in the existing market, and relevant instruments and devices are supplied sufficiently and cheaply. The voltage value U or the current value I of the motor is measured so that the electrical parameter of the motor can be accurately measured and the cost of the chainsaw 10 can be reduced.

When the variation of an electrical parameter of one or more electrical parameters detected by the circuit detection module 640 is greater than or equal to the preset variation threshold corresponding to the electrical parameter, or the change rate of an electrical parameter of the one or more electrical parameters is greater than or equal to the preset change rate threshold of the electrical parameter, the controller 620 determines that the oil passage is in the jammed state.

In some examples, a current variation threshold $\Delta I_{fix}$ and a voltage variation threshold $\Delta U_{fix}$ of the motor and a current change rate threshold $RI_{fix}$ and a voltage change rate threshold $RU_{fix}$ of the motor for the jam of the oil passage may be preset.

In common working environments, it may be set that the current variation threshold $\Delta I_{fix} \geq 450$ mA, the voltage variation threshold $\Delta U_{fix} \geq 1$ V, the current change rate threshold $RI_{fix} \geq 4.5$ mA/ms, or the voltage change rate threshold $RU_{fix} \geq 0.01$ V/ms, so as to satisfy most working conditions of the chainsaw 10. When the chain 100 operates on materials of different types, different values of the electrical parameter may be preset to adapt to corresponding working conditions.

The variation or the change rate of the electrical parameter of the motor is monitored so that whether the oil passage of the liquid pump 410 is jammed is determined. Besides this, the present application further provides a method for determining whether the oil passage is jammed by monitoring the temperature of the chainsaw 10: after the oil passage is jammed, a lubricant or a cooling liquid outputted from the liquid pump 410 cannot satisfy the requirement for lubricating or cooling the chain 100, and thus the temperature of the chainsaw 10 increases. In some examples, it may be set that if a sharp increase of the temperature of the chain is monitored, it may be determined that the oil passage of the liquid pump 410 is jammed.

The present application further provides a method for releasing the jammed state of the chainsaw 10 and the corresponding chainsaw 10. As described above, the "motor" may represent the first motor 300 for simultaneously driving the chain 100 and the liquid pump 410 to operate in some examples or represent the second motor 420 for driving the liquid pump 410 to operate in some examples.

The controller 620 of the chainsaw 10 may be configured to, when the liquid pump 410 is in the jammed state, control the motor to be in an on-off mode. When the value of the electrical parameter is within a preset range, the controller 620 controls the motor to exit the on-off mode, where in the on-off mode, the motor is in an on state and an off state alternately.

The controller 620 of the chainsaw 10 may also be configured to, when the liquid pump 410 is in the jammed state, control the value of the electrical parameter of the motor to be lower than a preset electrical parameter threshold. When the value of the electrical parameter is within the preset range, the controller 620 controls the motor to exit the on-off mode, where in the on-off mode, the motor is in the on state and the off state alternately.

After determining that the oil passage is in the jammed state, the controller 620 may control the liquid pump assembly 400 to enter a throttling mode in which a supplied amount of the liquid is reduced; and when the liquid pump 410 exits the jammed state, the controller 620 may control the liquid pump assembly 400 to exit the throttling mode.

The controller 620 may control the motor to turn on and off at a frequency F so that the liquid pump 410 releases the liquid for lubricating or cooling the chain 100 at a lower frequency. Alternatively, the controller 620 may keep the current I lower than or equal to a current threshold $I_{fix}$ or keep the voltage U lower than or equal to a voltage threshold $U_{fix}$ to reduce working power of the liquid pump 410 and reduce an amount of the liquid released by the liquid pump 410 at a time to lubricate or cool the chain 100. As the working frequency or the working power of the liquid pump 410 is reduced, an amount of the liquid outputted from the liquid pump 410 becomes smaller and the jammed state of the oil passage is gradually relieved.

Optionally, in some examples, after determining that the oil passage is in the jammed state, the controller 620 may not only control the motor to be in the on-off mode but also control the value of the electrical parameter of the motor to be lower than the preset electrical parameter threshold, thereby reducing the frequency at which the liquid pump 410 releases the lubricating or cooling liquid and reducing an amount of the lubricating or cooling liquid released by the liquid pump 410 at a time.

In some specific examples, the first motor 300 may simultaneously drive the chain 100 and the liquid pump 410 to operate. Therefore, the first motor 300 may be controlled to be in the on-off mode and/or the first motor 300 may be controlled to be in a low-power state so that the oil passage is gradually released from the jam.

However, since the first motor 300 simultaneously drives the chain 100 and the liquid pump 410 to operate, a decrease of a working frequency or working power of the first motor 300 may affect the cutting operation of the chain 100. In some examples, the motor may include the first motor 300 and the second motor 420, the first motor 300 is used for driving the chain 100 to operate, and the second motor 420 is used for driving the liquid pump 410 to operate. A working frequency or working power of the second motor 420 may be reduced so that the oil passage of the liquid pump 410 is gradually released from the jam, thereby avoiding an effect on the operation of the chain 100.

In some examples, a range of values of the electrical parameter of the motor when the oil passage is not in the jammed state may be preset. Optionally, it may be set that when the value of the electrical parameter is N times the preset electrical parameter threshold, the value of the electrical parameter is within the preset range. In some examples, a voltage threshold $U_{fix}$ and a current threshold $I_{fix}$ of the motor when the oil passage is not in the jammed state may be preset. When the current I of the motor approximates to the current threshold $I_{fix}$ or the voltage U approximates to the voltage threshold $U_{fix}$, the controller 620 may determine that the current oil passage is released from the jammed state or is about to be released from the jammed state and control the motor to exit the on-off mode to restore an amount of the liquid supplied by the liquid pump 410 to lubricate or cool the chain 100.

In the common working environments, it may be set that $0.5 \le N \le 0.9$, so as to satisfy most working conditions of the chainsaw 10. Specifically, under some working conditions where the chainsaw 10 has a strict requirement for lubrication or cooling, it may be set that $0.8 \le N \le 0.9$ or $0.90 \le N \le 0.99$, so as to satisfy the strict requirement of the chainsaw 10 for lubrication or cooling.

In some examples, the controller 620 may control the motor to be in the on state within an on duration L3. Optionally, in the common working environments, it may be set that the on duration L3 is a fixed value, where 2 s≤L3≤15 s, so as to satisfy most working conditions of the chainsaw 10. Alternatively, it may be set that the on duration L3 satisfies a linear relationship with $\Delta I_{fix}$ or $\Delta U_{fix}$ to adapt to lubrication or cooling requirements under different working conditions. In an example, the on duration L3 is negatively correlated to the current variation threshold $\Delta I_{fix}$. That is to say, the larger the current variation threshold $\Delta I_{fix}$, the smaller the on duration L set by the controller 620, and vice versa. For example, $L3 = K1 * \Delta I_{fix} + b1$, where K1 and b1 are constants and have different values under different working conditions. In an example, the on duration L3 is negatively correlated to the voltage variation threshold $\Delta U_{fix}$. That is to say, the larger the voltage variation threshold $\Delta U_{fix}$, the smaller the on duration L set by the controller 620, and vice versa. For example, $L3 = K2 * \Delta U_{fix} + b2$, where K2 and b2 are constants and have different values under different working conditions.

In some examples, the controller 620 may control the motor to switch between the on state and the off state at the frequency F. Optionally, in the common working environments, it may be set that the on-off frequency F is a fixed value, where F≤1 Hz, so as to satisfy most working conditions of the chainsaw 10. Alternatively, it may be set that the on-off frequency F satisfies a linear relationship with $\Delta I_{fix}$ or $\Delta U_{fix}$ to adapt to the lubrication or cooling requirements under different working conditions. In an example, the on-off frequency F is positively correlated to the current variation threshold $\Delta I_{fix}$. That is to say, the larger the current variation threshold $\Delta I_{fix}$, the larger the on-off frequency F set by the controller 620, and vice versa. For example, $F=K3*\Delta I_{fix}+b3$, where K3 and b3 are constants and have different values under different working conditions. In an example, the on-off frequency F is positively correlated to the voltage variation threshold $\Delta U_{fix}$. That is to say, the larger the voltage variation threshold $\Delta U_{fix}$, the larger the on-off frequency F set by the controller 620, and vice versa. For example, $F=K4*\Delta U_{fix}+b4$, where K4 and b4 are constants and have different values under different working conditions.

Figure 6:
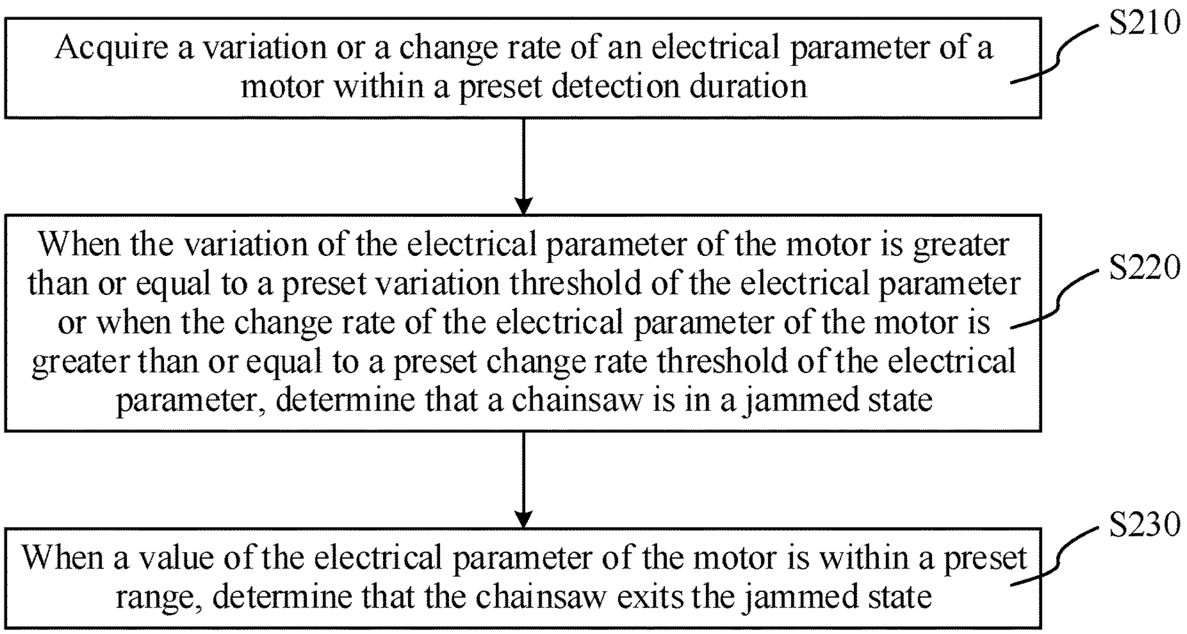
FIG. 6 is a flowchart of a control method for determining whether a liquid pump is in a jammed state for a chainsaw of the present application.

As shown in FIG. 6, the present application provides a control method for determining whether the liquid pump 410 of the chainsaw 10 is in the jammed state, and the steps are described below.

In S210, the variation or the change rate of the electrical parameter of the motor within the preset detection duration L2 is acquired.

In S220, when the variation of the electrical parameter of the motor is greater than or equal to the preset variation threshold of the electrical parameter or when the change rate of the electrical parameter of the motor is greater than or equal to the preset change rate threshold of the electrical parameter, it is determined that the liquid pump is in the jammed state.

Figure 7:
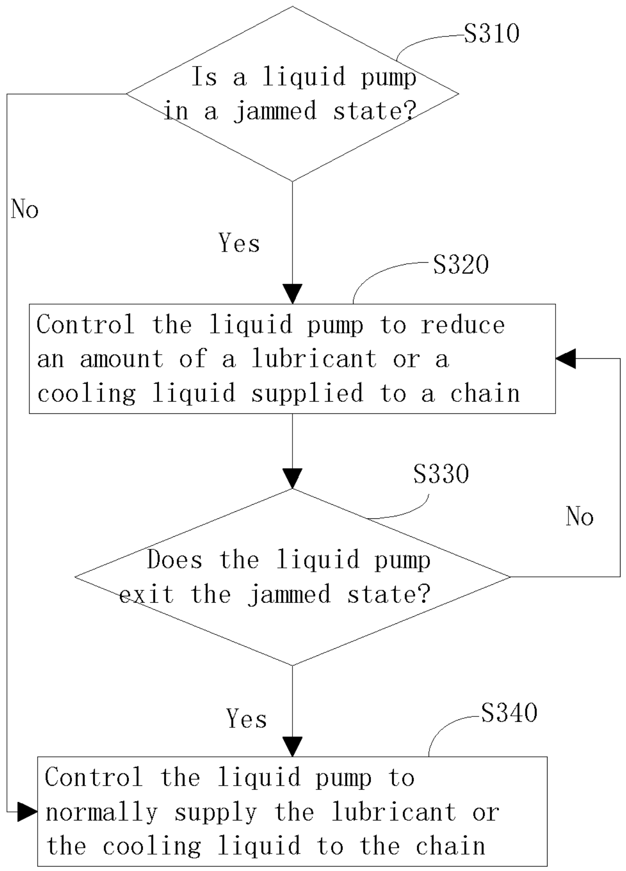
FIG. 7 is a flowchart of a control method for releasing a jammed state for a chainsaw of the present application.

As shown in FIG. 7, the present application provides a control method for releasing the jammed state of the chainsaw 10, and the steps are described below.

In S310, it is determined whether the liquid pump 410 is in the jammed state. If so, enter S320, and the liquid pump is controlled to enter a throttling mode in which a supplied amount of the liquid is reduced. If not, enter S340, and the liquid pump is controlled to supply the lubricant or cooling liquid to the chain normally.

After S320 and in S330, it is determined whether the liquid pump 410 exit the jammed state. If so, enter S340, and the liquid pump is controlled to supply the lubricant or cooling liquid to the chain normally. If not, return to S320

Figure 8:
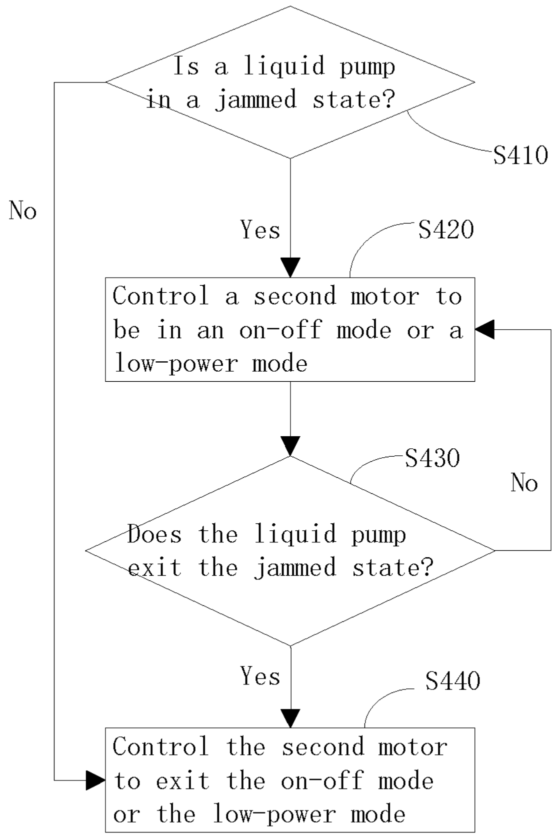
FIG. 8 is a flowchart of another control method for releasing a jammed state for a chainsaw of the present application.

As shown in FIG. 8, the present application provides another control method for releasing the jammed state of the chainsaw 10, and the steps are described below.

In S410, it is determined whether the liquid pump 410 is in the jammed state. If so, the value of the electrical parameter of the second motor is controlled to be lower than the preset electrical parameter threshold so that the second motor is in the low-power mode, or the second motor is controlled in an on-off mode, and step S420 is performed. If not, the motor is controlled to exit the low-power mode or the on-off mode. In the on-off mode, the motor is in the on state and the off state alternately.

In S430, it is determined whether the value of the electrical parameter is within the preset range. If so, the motor is controlled to exit the low-power mode or the on-off mode, and step S440 is performed. If not, the motor is controlled to be in the low-power mode or the on-off mode, and return to S320.

The preceding parameters may be pre-stored in the memory 650 and read by the parameter reading module 660, for example, empirical parameters such as the preset detection duration L2, the on duration L3, the on-off frequency F, the current variation threshold $\Delta I_{fix}$, the voltage variation threshold $\Delta U_{fix}$, the voltage value $U_{fix}$ and the current value $I_{fix}$ of the second motor 420 when the oil passage is not in the jammed state, N, K1, K2, K3, K4, b1, b2, b3, and b4.

In some examples, after the chainsaw 10 is activated, the liquid pump 410 continuously releases the liquid for lubricating or cooling the chain 100 until the chainsaw 10 is turned off. However, an output tool does not need to be lubricated or cooled all the time during the activation of the chainsaw 10, and the continuous release causes a waste of the lubricating or cooling liquid. The present application provides an example that can reduce the consumption of the lubricating or cooling liquid while satisfying the good working performance of the chain 100.

In some examples, the controller 620 of the chainsaw 10 is configured to control the second motor 420 to be on and off cyclically: the second motor 420 is controlled based on an active duration L4 to be on, and then the second motor 420 is controlled based on an inactive duration L5 to be off.

Since the second motor 420 is used for driving the liquid pump 410 to release the liquid for lubricating or cooling the chain 100, the active duration L4 or the inactive duration L5 or the rotational speed V2 of the second motor 420 is controlled so that a volume or speed at which the liquid pump 410 releases the liquid can be controlled. Specifically, the controller 620 turns on and off the second motor 420 cyclically, thereby preventing the liquid pump 410 from continuously releasing the liquid for lubricating or cooling the chain 100, reducing the consumption of the liquid, and preventing the oil passage from being jammed.

The longer the active duration L4, the better the lubrication and cooling effect on the chain 100, but the consumption of the liquid also increases. The shorter the active duration L4, the smaller the consumption of the lubricating and cooling liquid, but the lubrication and cooling effect on the chain 100 becomes worse. The applicant has found through experiments that the active duration L4 set to be less than or equal to 5 s and greater than or equal to is can balance the requirements of the chain 100 for working performance and saving the consumption of the liquid under the common working conditions.

The shorter the inactive duration L5, the better the lubrication and cooling effect on the chain 100, but the consumption of the liquid also increases. The longer the inactive duration L5, the smaller the consumption of the lubricating and cooling liquid, but the lubrication and cooling effect on the chain 100 becomes worse. The applicant has found through experiments that the inactive duration L5 set to be greater than or equal to 5 s and less than or equal to 9 s can balance the requirements of the chain 100 for working performance and saving the consumption of the liquid under the common working conditions.

The applicant has found through experiments that the inactive duration L5 may be set to be longer than the active duration L4 so that the requirements of the chain 100 for working performance and saving the consumption of the liquid under the common working conditions can be balanced.

In some examples, the speed and a time for the liquid pump 410 to release the liquid for lubricating or cooling the chain 100 are fixed, which cannot satisfy the lubrication or cooling requirements of the chainsaw 10 under different working conditions. The present application provides an example that can adapt to the lubrication or cooling requirements of the chainsaw 10 under different working conditions.

In some examples, the chainsaw 10 further includes the temperature detection module 610 for detecting the ambient temperature TO of the chainsaw 10.

Optionally, the active duration L4 of the second motor 420 and the ambient temperature TO of the chainsaw 10 may satisfy a linear or non-linear relationship so that different amounts of the lubricating or cooling liquid are released under different working conditions. In an example, the active duration L4 is negatively correlated to the ambient temperature TO. That is to say, the higher the ambient temperature TO, the shorter the active duration L4 of the second motor 420 set by the controller 620, and vice versa. For example, L4=K5*T0+b5, where K5 and b5 are constants and have different values under different working conditions.

Optionally, the inactive duration L5 of the second motor 420 and the ambient temperature TO of the chainsaw 10 satisfy a linear or non-linear relationship so that different amounts of the lubricating or cooling liquid are released under different working conditions. In an example, the inactive duration L5 is positively correlated to the ambient temperature TO. That is to say, the higher the ambient temperature TO, the longer the inactive duration L5 of the second motor 420 set by the controller 620, and vice versa. For example, L5=K6*T0+b6, where K6 and b6 are constants and have different values under different working conditions.

In some examples, the chainsaw 10 further includes the speed detection module 630 for detecting the rotational speed V1 of the first motor 300.

Optionally, the active duration L4 of the second motor 420 and the rotational speed V1 of the first motor 300 satisfy a linear or non-linear relationship so that different amounts of the lubricating or cooling liquid are released under different working conditions. In an example, the active duration L4 is positively correlated to the rotational speed V1 of the first motor 300. That is to say, the higher the rotational speed V1 of the first motor 300, the longer the active duration L4 of the second motor 420 set by the controller 620, and vice versa. For example, L4=K7*V1+b7, where K7 and b7 are constants and have different values under different working conditions.

Optionally, the inactive duration L5 of the second motor 420 and the rotational speed V1 of the first motor 300 satisfy a linear or non-linear relationship so that different amounts of the lubricating or cooling liquid are released under different working conditions. In an example, the inactive duration L5 is negatively correlated to the rotational speed V1 of the first motor 300. That is to say, the higher the rotational speed V1 of the first motor 300, the shorter the inactive duration L5 of the second motor 420 set by the controller 620, and vice versa. For example, L5=K8*V1+b8, where K8 and b8 are constants and have different values under different working conditions.

In some examples, the speed detection module 630 may also be used for detecting the rotational speed V2 of the second motor 420, and the controller 620 is configured to be capable of controlling, according to the rotational speed V1 of the first motor 300, the second motor 420 to rotate at the speed V2, where the rotational speed V1 of the first motor 300 and the rotational speed V2 of the second motor 420 satisfy a linear or non-linear relationship. In an example, the rotational speed V2 of the second motor 420 is positively correlated to the rotational speed V1 of the first motor 300. That is to say, the higher the rotational speed V1 of the first motor 300, the higher the rotational speed V2 of the second motor 420 set by the controller 620, and vice versa. For example, V2=K9*V1+b9, where K9 and b9 are constants and have different values under different working conditions.

In some examples, the rotational speed V2 of the second motor 420 is positively correlated to a linear speed V3 of the chain 100. That is to say, the higher the linear speed V3 of the chain 100, the higher the rotational speed V2 of the second motor 420 set by the controller 620, and vice versa. In an example, an optimal amount of the lubricating or cooling liquid per unit length of the chain 100 is C0. For example, the rotational speed V2 of the second motor 420 satisfies that V2=K0*V3*C0+b0, where K0, C0, and b0 are constants and have different values under different working conditions. The linear speed V3 of the chain 100 is linearly and positively correlated to the rotational speed V1 of the first motor 300. That is, the higher the rotational speed V1 of the first motor 300, the higher the linear speed V3 of the chain 100, and vice versa.

In some examples, the chainsaw 10 may be the chainsaw 10, the chain 100 is the chain 100, and the first motor 300 rotates the chain 100 by a sprocket. If a pitch of the chain 100 may be S0, the number of teeth of the sprocket may be N0, and a rotational speed of the sprocket may be V4, the linear speed of the chain 100 is $$V3 = \left(\frac{V4}{60}\right) * N_0 * S_0.$$

The controller 620 may control the rotational speed V2 of the second motor 420 to satisfy that $$V2 = K_0 * \left(\frac{V4}{60}\right) * N_0 * S_0 * C_0 + b_0,$$

so as to consume a smaller amount of the liquid and obtain relatively high lubrication or cooling efficiency.

The preceding parameters may be pre-stored in the memory 650 and read by the parameter reading module 660, for example, empirical parameters such as the optimal amount C0 of the lubricating or cooling liquid per unit length of the chain 100, the pitch S0 of the chain 100, the number N0 of teeth of the sprocket, K5, K6, K7, K8, K9, b5, b6, b7, b8, and b9.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A chainsaw, comprising:

a chain for implementing a cutting operation;

a liquid pump assembly comprising a liquid pump for lubricating or cooling the chain and a motor for at least driving the liquid pump to operate; and a controller electrically connected to the liquid pump assembly, wherein the controller is configured to:

determine that the liquid pump is in a jammed state;

in response to determining that the liquid pump is in the jammed state, control the liquid pump assembly to enter a throttling mode in which a supplied amount of a liquid is reduced so as to cause the liquid pump to exit the jammed state; and in response to the liquid pump exiting the jammed state, control the liquid pump assembly to exit the throttling mode.

2. The chainsaw according to claim 1, wherein the controller is configured to control the motor to be in an on-off mode so that the liquid pump assembly enters the throttling mode when the liquid pump is in the jammed state, and control the motor to exit the on-off mode when the liquid pump exits the jammed state.

3. The chainsaw according to claim 2, wherein in the on-off mode, the controller is configured to control, based on an active duration or an inactive duration, the motor to be in an on state and an off state cyclically; and the active duration is shorter than the inactive duration.

4. The chainsaw according to claim 1, wherein the controller is configured to, when the liquid pump is in the jammed state, control the motor to be in a low-power mode, and, when the liquid pump exits the jammed state, control the motor to exit the low-power mode; and, in the low-power mode, a value of an electrical parameter of the motor is lower than a preset electrical parameter threshold.

5. The chainsaw according to claim 4, further comprising a circuit detection module for detecting the electrical parameter of the motor.

6. The chainsaw according to claim 4, wherein the controller is configured to acquire a variation or a change rate of the electrical parameter within a preset detection duration and, when the variation of the electrical parameter is greater than or equal to a variation threshold of the electrical parameter or when the change rate of the electrical parameter is greater than or equal to a change rate threshold of the electrical parameter, determine that the liquid pump is in the jammed state.

7. The chainsaw according to claim 6, wherein the preset detection duration is greater than or equal to 20 ms and less than or equal to 100 ms.

8. The chainsaw according to claim 6, wherein the electrical parameter comprises a voltage or a current.

9. The chainsaw according to claim 8, wherein a variation threshold of the current is greater than or equal to 450 mA.

10. The chainsaw according to claim 8, wherein a variation threshold of the voltage is greater than or equal to 1 V.

11. The chainsaw according to claim 8, wherein a change rate threshold of the current is greater than or equal to 4.5 mA/ms.

12. The chainsaw according to claim 8, wherein a change rate threshold of the voltage is greater than or equal to 0.01 V/ms.

13. The chainsaw according to claim 4, wherein the controller is configured to, when the value of the electrical parameter of the motor is within a preset range, determine that the liquid pump exits the jammed state.

14. The chainsaw according to claim 13, wherein the controller is configured to, when the value of the electrical parameter is N times the preset electrical parameter threshold, determine that the value of the electrical parameter is within the preset range, and $0.5 \leq N \leq 0.9$.

15. The chainsaw according to claim 1, further comprising a temperature detection module, wherein the controller is configured to acquire an ambient temperature outputted from the temperature detection module and, when the ambient temperature is greater than a first temperature threshold, control the motor to start.

* * * * *